United States Patent [19]

Walker

[11] 4,089,990

[45] May 16, 1978

[54] BATTERY PLATE AND METHOD OF MAKING

[76] Inventor: Henry D. Walker, 4906 Bluebell Ave., North Hollywood, Calif. 91607

[21] Appl. No.: 451,107

[22] Filed: Mar. 14, 1974

[51] Int. Cl.$^2$ .................. C23C 11/00; C23C 13/00
[52] U.S. Cl. .................. 427/38; 427/115; 427/12.4; 427/250; 204/192 C
[58] Field of Search .......... 136/26, 27, 57, 19, 136/64, 65; 117/227, 230, 61, 49, 93.3, 107, 119; 204/53, 298, 192; 427/38, 115, 124, 250

[56] References Cited

U.S. PATENT DOCUMENTS

| 715,343 | 12/1902 | Blanc | 136/64 |
|---------|---------|-------|--------|
| 2,713,079 | 7/1955 | Carrick et al. | 136/57 X |
| 3,281,262 | 10/1966 | Brick | 117/61 X |
| 3,788,877 | 1/1974 | Helwig et al. | 117/107 X |

*Primary Examiner*—Anthony Skapars
*Attorney, Agent, or Firm*—McDougall, Hersh & Scott

[57] ABSTRACT

A battery plate is disclosed having a core of aluminum, for example, which has its oxide coating removed and replaced by a thin film of lead. Such a plate has a higher conductivity and is lighter in weight with superior performance characteristics than a conventional lead-antimony plate.

9 Claims, No Drawings

BATTERY PLATE AND METHOD OF MAKING

BACKGROUND OF THE INVENTION

This invention relates to battery plates, and more particularly, to an improvement in the method of producing said plates. In producing battery plates, it is desirable to produce plates which are capable of carrying high currents for rapid charging and output performance, while at the same time reducing their weight and size. The present invention teaches the production of battery plates which have a reduced internal resistance over present lead-antimony plates and which are smaller in size and weight.

In my copending application Ser. No. 313,835, filed Dec. 11, 1972, now abandoned, I describe in detail a method for producing an aluminum storage battery plate by dipping a relatively pure aluminum core into a solution of sodium hydroxide and, preferably either zinc oxide or zinc chloride, for the purpose of simultaneously removing the aluminum oxide coating on the core and replacing it with a pure zinc layer. It is desirable to accomplish both the oxide removal and the zinc plating simultaneously because the aluminum oxide tends to reform immediately. The zinc layer is utilized to obtain subsequent deposition of a lead coating either with or without a precoating of silver. The zinc and silver precoatings are necessary because it is not possible, by chemical deposition techniques, to deposit lead directly onto aluminum.

OBJECTS OF THE INVENTION

It is an object of the present invention to provide an improved battery plate of an aluminum core having a lead coating deposited directly thereon.

It is a further object of the present invention to provide a method for forming battery plates of higher conductivity and superior charging capability utilizing vacuum deposition techniques.

It is a further object of the present invention to produce an aluminum core battery plate having a lead coating deposited thereon without the need for precoatings of materials such as zinc and/or silver.

SUMMARY OF THE INVENTION

The present invention relates to a method for producing aluminum battery plates having a lead coating thereon. The method utilizes one or more of the following vacuum techniques, namely, thermal evaporation, plasma deposition (sputtering), and ion implantation (thermal evaporation with ionization). By these methods, or a combination of them, a thin but dense film of pure lead can be adhered to an aluminum core, whose oxide layer is preferably removed, to form a battery plate having superior electrical characteristics reduced in both size and weight from those conventionally available. After producing the lead film on the aluminum core, if an additional lead coating is desired the method described in my copending application Ser. No. 313,385 may be utilized.

DETAILED DESCRIPTION

In order to obtain a film of pure lead with good adherence qualities on an aluminum core, it is necessary to use one or more of the following vacuum techniques: Thermal evaporation, plasma deposition (sputtering) or ion implantation (thermal evaporation with ionization).

Thermal evaporation of lead onto an aluminum core is accomplished by heating pure lead in a vacuum chamber causing it to vaporize and recondense onto the core, to form a lead film thereon. The steps include placing pure lead into a boat or filament which is connected to a high current low voltage power supply. The heat from the filament is transferred to the lead by conduction. When the temperature of the lead reaches the evaporation point, its atoms begin to evaporate as the thermal energy surpasses the level of the surface tension energy. The vaporized molecules move from their source to the other solid surfaces of the vacuum chamber such as the core and the chamber walls condensing thereon due to the temperature differential. Condensation produces the lead film formation on the aluminum core. No removal of the aluminum oxide is obtained in this process. However, such removal is a desirable objective in making high performance battery plates, and thus where this technique is used the aluminum oxide is substantially removed by a sodium hydroxide or the like prior to placing the aluminum into the vacuum chamber.

EXAMPLE I

A pure lead film was deposited on an aluminum core having its oxide coating substantially removed, in a vacuum chamber having a pressure of $2 \times 10^{-5}$ torr. The rate of deposition was 50 angstroms per minute.

EXAMPLE II

In a vacuum chamber having a pressure of $2 \times 10^{-7}$ torr, a film of pure lead was obtained on an aluminum core with a deposition rate of 15,000 angstroms per minute.

In both examples a uniform film having good adhesion properties was obtained.

A second vacuum deposition technique known as ion sputtering may be employed. In ion sputtering two electrodes are immersed in an inert gas medium at reduced pressure. The material to be coated, for example, an aluminum core, is utilized as the cathode. The coating material to be deposited on the aluminum, for example, lead, is utilized as the anode. A plasma is maintained by either a D.C. or R.F. potential which continually ionizes the inert gas molecules. The electrodes are bombarded by the gaseous ions in the presence of a high electric field. The kinetic energy of the gaseous ions (on the order of 150 to 600 electron volts) exceeds the bonding energy of the surface molecules of the electrodes causing them to be dislodged from the surface. In the case of the aluminum cathode, this produces a removal of the aluminum oxide surface layer for effectively cleaning the aluminum plate. In the case of the pure lead this bombardment is effective for dislodging molecules from the surface. The lead molecules are accelerated by the electric field thereby to cause a lead film to condense and adhere to the cleaned aluminum cathode.

EXAMPLE III

In a vacuum chamber of 1.0 to $15 \times 10^{-3}$ torr and utilizing 50 to 600 watts of R.F. power, a deposition rate of approximately 1,000 angstroms per minute of lead onto the cleaned aluminum core is obtained.

A third technique combines the first two techniques and produces an increased deposition rate. The third technique is known as ion-plating. As in the sputtering technique, electrodes are immersed in an inert gas medium such as argon at reduced pressure. The aluminum substrate which is to receive the film is connected as the cathode. A plasma is maintained either by a D.C. or R.F. potential. An evaporation source is utilized as the anode and may be a boat or filament together with the evaporant lead. Positive ions in the plasma are accelerated towards the cathode (the aluminum core) by the electrical field gradient thereby bombarding and continuously cleaning the plate's core prior to the film deposition.

While the surface of the aluminum is cleaned by the plasma bombardment, the pure lead is evaporated by heat. The evaporated lead becomes ionized on passing through the plasma. The ionized lead atoms are accelerated towards the cathode (the aluminum core) simultaneously with the sputtering action which is cleaning the surface. In this manner the aluminum surface is sputtered, removing the aluminum oxide, both before and during plating. This maintains a clean surface until the first monolayer of the lead film is deposited on the surface, and at the same time roughens the surface to insure strong adhesion of the first monolayer. The higher the velocity with which the lead particles are accelerated, the deeper the penetration of the lead onto the surface of the aluminum.

The plasma bombarding of the core is essential for it is effective to remove the naturally occurring aluminum oxide from the surface of the core. Further, it cleans and etches the surface to reduce surface defects. The removal of the aluminum oxide and the cleaning of the surface produce greatly improved electrical characteristics. Removal of the oxide also facilitates the proper deposition of lead onto the aluminum, a result which has not heretofore been obtainable without the utilization of intermediate depositions of metals such as zinc between the lead and aluminum surfaces.

It is desirable to provide shutters between the cathode and anode to collect the removed aluminum oxide and other particles which are freed from the aluminum substrate by the sputtering process to thereby reduce contamination.

EXAMPLE IV

Ion plating in a vacuum chamber having a pressure of from $5 \times 10^{-5}$ to $8 \times 10^{-4}$ torr, a film of 1,000 to 15,000 angstroms per minute of high purity lead was deposited on the aluminum core. The dielectric was kept at about 10 to 13 mm at 20 to 25 millitorr with a current density of approximately 0.3 to 0.8 m amps per $cm^2$.

Film deposition rates are nearly linear functions of the deposition period. By varying the process parameters of pressure, power and electrode distance the film deposition rate can be changed as desired. The lead may be vaporized by resistance heating in a dielectric crucible heated by eddy currents induced by an external R.F. diode coil. Use of this technique permits deposition rates up to about 200,000 angstroms per minute.

Although the foregoing description discloses a technique for forming battery plates wherein lead is directly coated onto aluminum as the aluminum oxide layer is removed, it is also possible to utilize the present invention where a mechanical barrier coating is first placed over the aluminum. For example, as disclosed in my copending application, an aluminum core can have its oxide removed and replaced with pure zinc followed by a thin layer of silver and thereafter a lead film. Additional lead is then deposited over the lead film by the present method. A similar example is an oxide free aluminum plate which has been silver plated and then has a lead film formed thereon.

A third variation is to first deposit a lead film on the aluminum by the present method and to then add a lead coating by the electrochemical plating technique of my copending application. A sufficiently porous coating formed in this manner will eliminate the need for lead paste usually required for negative plates.

A fourth variation is to first deposit lead in a vacuum by either method and then utilizing either method for depositing lead oxide on the plate. This will eliminate paste that is required for the positive plates of a battery.

A final variation is to deposit directly by the vacuum techniques of the present invention lead oxide on the aluminum core, also by electrochemical deposit.

Utilization of plates formed according to this invention will not be subject to the usual hydrogen embrittlement. Their performance is superior in comparison to lead-antimony type plates. Further, the use of such plates will produce a battery cell having higher efficiency and discharge rate at low temperatures. The plates are thinner than the standard plates and thus a larger number of plates can be placed in a given cell. A partial improvement in the performance of a battery having plates according to the present invention is due to the absence of the antimony usually present in lead. The present process by use of pure lead, eliminates the electrical couple formed between lead and antimony which tends to cause self-discharging and create internal resistance in the battery. An additional advantage is the improved circulation of electrolyte between the thinner plates which carries away small bubbles usually present in a standard cell further reducing internal resistance.

While I have described embodiments of this invention in some detail, it will be understood that this description and illustrations are offered merely by way of example, and that the invention is to be limited in scope only by the appended claims.

I claim:

1. A method of producing a coated battery plate comprising:
   (a) placing a plate to be coated and a supply of lead in a reduced pressure chamber containing an inert gas;
   (b) connecting said plate as a cathode electrode and the lead as an anode electrode to an electrical power source to produce an electric field; and
   (c) coating said plate with lead particles dislodged from the anode by ionizing the gas to produce ion bombardment of the electrodes.

2. The method of claim 1 wherein the plate is aluminum and has a surface coating of aluminum oxide thereon and the step of coating also causes the removal of the aluminum oxide by ion bombardment during the coating process.

3. The method according to claim 1 wherein the inert gas is Argon.

4. A method of producing a coated battery plate comprising:
   (a) cleaning said battery plate in a reduced pressure chamber by ion bombardment by ions of an inert gas;
   (b) depositing a lead film simultaneously on said plate as said plate is cleaned by said bombardment.

5. The method according to claim 4 wherein said plate is aluminum and its surface is coated with aluminum oxide which is removed by said ion bombardment.

6. The method according to claim 4 further including the step of collecting materials removed from the surface of the plate during cleaning to prevent contamination during the deposition process.

7. The method according to claim 4 wherein the step of depositing a lead film includes the sub-steps of:
heating a lead supply in said chamber to its vaporization point, condensing lead on said plate by maintaining said plate at a temperature less than the vaporization point of lead.

8. The method according to claim 4 further including the step of:
adding at least one additional coating of lead by electrochemical plating to produce a porous lead coating eliminating the need for lead paste when the plate so produced is utilized as a negative battery plate.

9. The method according to claim 4 further including the step of:
depositing lead oxide over said lead film to produce a plate which does not require lead oxide paste when utilized as a positive battery plate.

* * * * *